United States Patent [19]

Miyake et al.

[11] 4,341,685
[45] Jul. 27, 1982

[54] PROCESS FOR PREPARING ORGANIC DISPERSION OF ACID TYPE FLUORINATED POLYMER

[75] Inventors: Haruhisa Miyake; Yoshio Sugaya; Tatsuro Asawa, all of Yokohama, Japan

[73] Assignee: Asahi Glass Company, Ltd., Tokyo, Japan

[21] Appl. No.: 203,391

[22] Filed: Nov. 3, 1980

[30] Foreign Application Priority Data

Nov. 20, 1979 [JP] Japan ................................ 54/149479
Dec. 7, 1979 [JP] Japan ................................ 54/157989

[51] Int. Cl.$^3$ .............................................. C08K 5/02
[52] U.S. Cl. ..................................... 524/104; 526/243; 526/245; 526/250; 526/255; 524/376; 524/544; 524/379; 524/389; 524/356; 524/354; 524/251
[58] Field of Search ............... 526/243, 245, 255, 250; 260/32.8 R, 32.6 R, 30.2, 33.2 R, 31.6

[56] References Cited

U.S. PATENT DOCUMENTS 3,075,939 1/1963 Bauer ................................. 260/31.6

FOREIGN PATENT DOCUMENTS 53-159984 12/1978 Japan .................................... 214/18

Primary Examiner—Joseph L. Schofer
Assistant Examiner—N. Sarofim
Attorney, Agent, or Firm—Oblon, Fisher, Spivak, McClelland & Maier

[57] ABSTRACT

An organic dispersion is prepared of an acid type fluorinated polymer comprises copolymerizing a fluorinated ethylenically unsaturated monomer and a functional monomer having an acid type functional group in an aqueous medium under an action of a polymerization initiator source to obtain an aqueous dispersion of an acid type fluorinated polymer having the functional monomer unit content of 5 to 40 mol %; and replacing an aqueous medium of the aqueous dispersion to a hydrophilic organic medium under maintaining the dispersion.

11 Claims, No Drawings

PROCESS FOR PREPARING ORGANIC DISPERSION OF ACID TYPE FLUORINATED POLYMER

BACKGROUND OF THE INVENTION

1. Field of the Invention

The present invention relates to a process for preparing an organic dispersion of an acid fluorinated polymer. More particularly, it relates to a novel process for preparing an organic dispersion having high concentration by replacing an aqueous medium of an aqueous dispersion obtained by a copolymerization in an aqueous medium to a hydrophilic organic medium under maintaining the dispersion.

2. Description of the Prior Art

Fluorinated polymers are usually durable to organic solvents and accordingly, organic solutions of the fluorinated polymer have not been substantially known. Especially organic solvents which can dissolve fluorinated polymers having many fluorine atoms bonded to each carbon atoms of a main chain skeleton have not been substantially known.

On the other hand, if such solution of the fluorinated polymer is obtained, various applications of the fluorinated polymers will be developed.

It has been noted that copolymers of a fluorinated olefin such as tetrafluoroethylene and a fluorinated monomer having carboxylic acid type or sulfonic acid type group can be used for a cation exchange membrane having excellent oxidation resistance, chlorine resistance, alkali resistance and heat resistance which is used for producing an alkali metal hydroxide and chlorine, and also used for a membrane for a fuel cell and a membrane for dialysis and other uses. If an organic solvent solution of the acid type fluorinated polymer can be obtained, the fabrication of the membrane is easily made whereby a membrane having a complicated configuration or a remarkably thin membrane can be obtained or a membrane can be smoothly obtained by a dipping process or pin holes of a membrane can be easily repaired or a surface of a product can be easily coated by the fluorinated polymer. Various advantages are considered by the preparation of the solutions.

In the case of the fluorinated polymers having strong acidic groups having high polarity such as sulfonic acid groups, it has been known that the fluorinated polymer having only specific form such as sulfonic acid, sulfamide or sulfonate can be dissolved into a special organic solvent having high polarity as disclosed in Japanese Patent Publication No. 13,333/1973. Thus, in the case of the fluorinated polymer having carboxylic acid groups, the polymers are not be dissolved into the organic solvents for dissolving sulfonic acid type fluorinated polymer because of carboxylic acid group of the polymer.

The organic solvent solutions of carboxylic acid type fluorinated polymer have been found as disclosed in Japanese Unexamined Patent Publication No. 107949/1979 as the solutions of fluorinated polymer having carboxylic acid groups as —COOQ (Q: alkali metal atom) in an organic solvent having high polarity such as alcohols and glycols or Japanese Patent Application No. 56912/1979 as the solutions of fluorinated polymer having pendant carboxylic ester groups in an organic fluorinated solvent such as trichlorotrifluoroethane and benzotrifluoride.

According to the studies, it is difficult to increase a concentration of the fluorinated polymer in such organic solvent solutions. Only the solution having a concentration of upto 5 wt. % has been obtained. It is preferable to increase the concentration of the fluorinated polymer in a fabrication of a membrane from the solution.

SUMMARY OF THE INVENTION

It is an object of the present invention to provide a process for preparing an organic dispersion of an acid type fluorinated polymer having high concentration.

It is another object of the present invention to provide a process for preparing an organic dispersion of an acid type fluorinated polymer which is used for fabrication of a membrane.

The foregoing and other objects of the present invention have been attained by preparing an organic dispersion of an acid type fluorinated polymer by copolymerizing a fluorinated ethylenically unsaturated monomer and a functional monomer having an acid type functional group in an aqueous medium under an action of a polymerization initiator source to obtain an aqueous dispersion of an acid type fluorinated polymer having the functional monomer unit content of 5 to 40 mol %; and replacing an aqueous medium of the aqueous dispersion to a hydrophilic organic medium under maintaining the dispersion.

DETAILED DESCRIPTION OF THE PREFERRED EMBODIMENTS

The organic dispersion means a dispersion of the fluorinated polymer in a hydrophilic organic medium which can contain less than 30% preferably less than 20% of water. The hydrophilic organic medium is selected in view of the use of the organic dispersion.

Various studies for preparing a solution having high concentration and the following interest facts have been found.

The fluorinated polymers having acid type functional groups such as carboxylic acid, sulfonic acid or phosphonic acid type groups can be obtained in a form of an aqueous dispersion having high concentration by an emulsion polymerization in an aqueous medium etc. The aqueous medium of the aqueous dispersion can be replaced to a hydrophilic organic solvent such as alcohols. The reason is not clear, however, an organic dispersion having stable dispersibility can be obtained without any damage of the dispersion even though the aqueous medium is replaced to a hydrophilic organic solvent. Thus, the resulting organic dispersion can be used for the fabrication of a film as the organic solvent solution. For example, an aqueous latex of a carboxylic acid type fluorinated polymer can be separated to an aqueous medium and a latex layer having higher concentration of the polymer by a desirable centrifugal separation. A hydrophilic organic medium is added to the concentrated latex and the centrifugal separation is repeated to decrease the content of the aqueous medium in the concentrated latex whereby the replacement to the hydrophilic organic medium is attained. The carboxylic acid type fluorinated polymer is dispersed in the hydrophilic organic medium while maintaining the dispersion as the aqueous latex. The organic dispersion having high concentration of the polymer as the aqueous latex can be obtained by replacement operation.

In accordance with the present invention, the organic dispersion having high concentration such as about 50 wt. % can be easily obtained by using various kinds of hydrophilic organic media and the organic dispersion has excellent mechanical and chemical stability. The viscosity of the organic dispersion can be controlled as desired by selecting the kinds of the organic medium depending upon the objects and uses. Thus, excellent film of a copolymer having no pinhole can be obtained by casting the organic dispersion.

In the present invention, it is important to use a functional monomer having carboxylic acid group, sulfonic acid group, phosphonic acid group or an acid type functional group which can be convertible to such acid group.

The acid type functional monomer (I) is preferably a fluorovinyl compound in view of chlorine resistance and oxidation resistance of the polymer.

The typical functional monomer used in the process of the present invention are fluorovinyl compounds having the formula $$CF_2=CX-(CFX')_p(OCF_2CFY)_l(O)_m(CFY')_nA$$

wherein p is 0 or 1; l is 0 to 3; m is 0 to 1; n is 0 to 12; X represents —F, —Cl or —CF$_3$; X' represents —F or —CF$_3$; Y represents —F or —CF$_3$; Y' represents —F or a C$_{1-10}$ perfluoroalkyl group; A represents —CN, —COF, —COOH, —COOR$_1$,
  —COOM or —COONR$_2$R$_3$, —SO$_2$F, —SO$_3$M, $$-SO_3H, \ -\overset{O}{\underset{\|}{P}}(OH)_2, \ -\overset{O}{\underset{\|}{P}}(OR^4)_2, \text{ and } -\overset{O}{\underset{\|}{P}}(OM)_2;$$

R represents a C$_{1-10}$ alkyl group; R$_2$ and R$_3$ respectively represent —H or R$_1$; R$_4$ represents R$_1$; M represents an alkali metal atom or a quaternary ammonium group.

From the viewpoints of the property and availability, it is preferable to use the fluorovinyl compound having the above-mentioned formula wherein X and X' are —F; Y is —CF$_3$; Y' is —F; p is 0 or 1; l is 0 to 1; m is 0 to 1; n is 0 to 8.

From the viewpoint of the copolymerization reaction, it is preferable to use the fluorovinyl compound having the formula wherein A is $$-COOR_1, \ -SO_2F \text{ or } -\overset{O}{\underset{\|}{P}}(OR^4)_2$$

and R is a lower alkyl group.

Typical fluorovinyl compounds include

CF$_2$=CFO(CF$_2$)$_{1-8}$COOCH$_3$,
CF$_2$=CFO(CF$_2$)$_{1-8}$COOC$_2$H$_5$,
CF$_2$=CF(CF$_2$)$_{0-8}$COOCH$_3$
CF$_2$=CFOCF$_2$CF(CF$_3$)OCF$_2$CF$_2$CF$_2$COOCH$_3$,
CF$_2$=CFCF$_2$O(CF$_2$)$_4$COOCH$_3$,
CF$_2$=CFCF$_2$OCF$_2$CF$_2$OCF$_2$COOCH$_3$,
CF$_2$=CFCF$_2$OCF(CF$_3$)COOCH$_3$,
CF$_2$=CFCF$_2$OCF(CF$_3$)CF$_2$OCF(CF$_3$)COOCH$_3$,
CF$_2$=CFOCF$_2$CF(CF$_3$)OCF$_2$CF$_2$SO$_2$F,
CF$_2$=CF$_2$SO$_2$F,
CF$_2$=CFCF$_2$OCF$_2$CF$_2$SO$_2$F and $$CF_2=CFO(CF_2)_{1-8}\overset{O}{\underset{\|}{P}}(OCH_3)_2.$$

The fluorinated ethylenically unsaturated monomers (II) can be tetrafluoroethylene, trifluorochloroethylene, hexafluoropropylene, trifluoroethylene, vinylidene fluoride and vinyl fluoride. It is preferable to use a fluorinated olefin having the formula CF$_2$=CZZ' wherein Z and Z' respectively represents —F, —Cl, —H or —CF$_3$, especially perfluoroolefins. It is optimum to use tetrafluoroethylene.

Two or more of the functional monomers (I) and two or more of the ethylenically unsaturated monomers (II) can be used.

It is possible to incorporate the other monomer such as olefins having the formula of $$CH_2=CR_4R_5 \hspace{3em} (III)$$

(R$_4$ and R$_5$ respectively represent —H or a C$_1$-C$_8$ alkyl group or an aromatic ring); and fluorovinyl ethers having the formula $$CF_2=CFOR_f$$

(R$_f$ represents a C$_1$-C$_{10}$ perfluoroalkyl group); and divinyl monomers such as CF$_2$=CF—CF=CF$_2$ and CF$_2$=CFO(CF$_2$)$_{1-4}$OCF=CF$_2$; and the other functional monomers such as carboxylic acid type, sulfonic acid type functional monomers and mixtures thereof.

Suitable olefins (III) include ethylene, propylene, butene-1, isobutylene, styrene, α-methylstyrene, pentene-1, hexene-1, heptene-1, 3-methyl butene-1, 4-methyl pentene-1, etc. It is especially preferable to use ethylene, propylene or isobutylene in view of the production and characteristics of the resulting copolymers.

It is possible to improve mechanical strength of fabricated products such as films and membranes by incorporating a divinyl monomer etc. to crosslink the copolymer.

In the production of the acid type fluorinated polymer of the present invention, the ratios of the functional monomer (I), the fluorinated olefin (II) the olefin compound (III) and the other monomer are important since the ratios relate to the characteristics of ion exchange membranes for electric cell or relate to the stability of the dispersion in the replacement from the aqueous dispersion to the organic dispersion by using the hydrophilic organic medium.

The amount of the functional monomer (I) directly relates to the ion exchange capacity and also relates to the stability of the dispersion and is preferably in a range of 5 to 40 mol % especially 10 to 30 mol %. When the ratio of the functional monomer (I) is too high, the mechanical strength of the ion exchange membrane made of the product is inferior and the ion exchange function is inferior because of the increase of water content whereas when the ratio of the functional monomer (I) is too low, the ion exchange function does not impart. Moreover, the stability for maintaining the dispersion in the replacement is disadvantageously inferior.

It is not clear why the acid type groups of the fluorinated polymer relate to the stability of the dispersion. Thus, the carboxylic acid type, sulfonic acid type or phosphonic acid type fluorinated polymer having the functional groups maintains the stable dispersion in the concentrated latex, whereas the fluorinated polymer having no functional group such as carboxylic acid group or sulfonic acid group causes coagulation of the latex in the concentration of the latex. Therefore, it is considered that the acid type groups may contribute to the stability of the dispersion. The discussion is to illustrate the present invention without limiting the present invention.

The remainders of the copolymer of the invention beside the compound (I) are mainly the compounds (II), (III) and the other compound. The ratio of the olefin (III) is important since it highly relates to electrical and mechanical characteristics for the ion exchange membrane such as chlorine resistance. Therefore, when the olefin (III) is incorporated, the molar ratio of the olefin (III) to the fluorinated olefin (II) is in a range of 5:95 to 70:30 especially 10:90 to 60:40. When the fluorovinyl ether or divinyl ether is incorporated, the ratio of the compound is in a range of less than 30 mol % especially about 2 to 20 mol %.

In the preferable embodiment of the present invention, an ion exchange capacity is selected from the range of 0.5 to 2.2 meq/g. dry resin. In the characteristic feature, a molecular weight of the copolymer can be large even though the ion exchange capacity is large. Therefore the mechanical property and the durability of the copolymer are not lowered by increasing the ion exchange capacity. The ion exchange capacity is depending upon the kind of the copolymer and preferably higher than 0.8 meq/g. dry resin especially higher than 1.0 meq/g. dry resin in view of the mechanical characteristics and electrochemical characteristics.

The molecular weight of the acid type fluorinated polymer of the present invention is important since it relates to the mechanical characteristics and the fabricatability of the membrane. It is preferable to have $T_Q$ of higher than 150° C. preferably 170° to 340° C. especially about 180° to 300° C.

In the specification, $T_Q$ is defined as follows. The temperature for a volumetric melt flow rate of 100 mm$^3$/sec. is defined to $T_Q$ which relates to the molecular weight of the copolymer. The volumetric melt flow rate is defined to the unit of m$^3$/sec. of the flow rate of the molten copolymer extruded through the orifice having a diameter of 1 mm and a length of 2 mm at a specific temperature under a pressure of 30 kg/cm$^2$.

An ion exchange capacity of a cation exchange membrane was measured as follows.

A H-type cation exchange membrane was immersed into IN-HCl at 60° C. for 5 hours to completely convert in to H-type membrane, and then, the membrane was washed with water so as to be free of HCl. Then, 0.5 g. of the H-type membrane was immersed into a solution prepared by adding 25 ml of water to 25 ml of 0.1 N-NaOH. Then, the membrane was taken out and the amount of NaOH in the solution was measured by a back titration with 0.1 N-HCl.

In the present invention, it is preferable to carry out the copolymerization of the fluorinated monomer and the fluorinated olefin at a ratio of the aqueous medium to the functional monomer of less than 20:1 preferably less than 10:1 by weight. When the amount of the aqueous medium is too much, the copolymerization reaction velocity is remarkably low to need a long time for high yield of the copolymer. When the amount of the aqueous medium is too much, it is not easy to give high molecular weight in the case of large ion exchange capacity. When the amount of the aqueous medium is too much, the disadvantageous requirement of a larger reactor and the disadvantageous operations for the separation and recovery of the copolymer are further found.

It is preferable to give a copolymerization reaction pressure of higher than 7 kg/m$^2$. When the reaction pressure is too low, it is difficult to maintain the reaction velocity to be the satisfactory level and it is also difficult to obtain the copolymer having a large molecular weight. When the reaction pressure is too low, the ion exchange capacity of the resulting copolymer is remarkably large whereby the mechanical strength is lowered and the deterioration of the ion exchange function is increased because of the increase of the water content. The copolymerization reaction pressure is preferably lower than 50 kg/cm$^2$ in view of the reactor and the operation in the industrial operation. It is possible to give higher pressure, however, the effect of the present invention is not proportionally improved. In the present invention, the copolymerization reaction pressure is usually in a range of 7 to 50 kg/cm$^2$ preferably 9 to 30 kg/cm$^2$.

In the copolymerization of the present invention, the conditions for the reaction and the other operation are not critical and can be selected from the broad ranges. For example, a reaction temperature is selected depending upon a kind of the polymerization initiator source and molar ratios in the reaction and is preferably in a range of 20° to 90° C. especially about 30° to 80° C. since the special high or low temperature is disadvantageous in view of the industrial operation.

The polymerization initiator source used in the present invention is preferably selected so as to impart high activity at the optimum reaction temperature. For example, the ionized radiation having high activity can be employed at lower than room temperature. In usual, it is advantageous to use an azo compound or a peroxy compound in view of the industrial operation.

Suitable polymerization initiator sources used in the present invention include compounds having high activity at about 20° to 90° C. under the copolymerization reaction condition, for example, diacyl peroxides such as disuccinic peroxide, benzoyl peroxide, lauroyl peroxide and dipentafluoropropionyl peroxide; azo compounds such as 2,2'-azobis(2-amidionopropane)hydrochloride, 4,4'-azobis(4-cyanovalerianic acid) and azobisisobutyronitrile; peroxy esters such as t-butyl peroxyisobutylate, t-butyl peroxypivalate; peroxydicarbonates such as diisopropyl peroxydicarbonate and di-2-ethylhexyl peroxydicarbonate; hydroperoxides such as diisopropylbenzene hydroperoxide; and inorganic peroxides such as potassium persulfate and ammonium persulfate and redox catalysts thereof.

In the process of the present invention, the concentration of the polymerization initiator is usually in a range of 0.0001 to 3 wt. % preferably 0.001 to 2 wt. % based on the total monomers. The molecular weight of the resulting copolymer can be increased and high ion exchange capacity can be maintained by decreasing the concentration of the initiator. When the concentration of the initiator is too high, the tendency for lowering the molecular weight is increased to be disadvantageous for the production of the copolymer having a large ion exchange capacity and high molecular weight.

It is possible to incorporate other additives used for polymerizations in an aqueous medium such as a surfactant, a dispersing agent, a buffering agent and a pH regulator etc. It is also possible to incorporate an inert organic solvent such as fluorinated or chlorofluorinated saturated hydrocarbons known as fron type solvents as far as the solvents which do not interrupt the copolymerization reaction of the fluorinated olefin and the functional monomer and have not large chain transferring function.

In the process of the invention, it is preferable to carry out the copolymerization under controlling the concentration of the resulting copolymer to less than 40 wt. % preferably less than 30 wt. %. When the concentration is too high, the disadvantages of high load for stirring, difficulty of heat removal and insufficient diffusion of the monomers are found.

In the process of the present invention, the aqueous dispersion obtained is treated by the replacing treatment by a hydrophilic organic medium. Various processes can be employed for the replacing treatment so far as the dispersion of the aqueous dispersion is maintained; for example, the process of combination of a separation of an aqueous medium layer by a centrifugal separation and an addition of a hydrophilic organic medium; or a process of combination of a separation of an aqueous medium layer by an electric decatation or a freezing method and an addition of a hydrophilic organic medium; and a process for evaporating water after an addition of a hydrophilic organic medium having a boiling point higher than that of water.

In usual, it is effective to select the process for repeating a separation of an aqueous medium by a centrifugal separation and an addition of a hydrophilic organic medium to the concentrated layer and a centrifugal separation so as to gradually replace the aqueous medium to the hydrophilic organic medium.

The hydrophilic organic media used in the replacing treatment of the present invention can be selected from various liquid media usually, water soluble organic liquid media in view of the smooth and effective replacement and separation of the aqueous medium, and especially organic liquid media which dissolve in water at higher than 0.5 wt. %.

Suitable hydrophilic organic media include alcohols, ketones, organic acids and aldehydes, amines, and also hydrophilic organic liquids which are miscible to water but not soluble to water such as pyrrolidones, esters and ethers. A mixed liquid media can be used.

The hydrophilic organic media is added to the concentrated latex to replace the aqueous medium to the hydrophilic organic medium and the operation is repeated depending upon the allowable concentration of water remained in the organic dispersion. It is usually enough to be several times. An amount of the hydrophilic organic medium added is not critical and is usually in a range of 0.5 to 20 wt. % based on the polymer.

In accordance with the present invention, it is possible to give high concentration of the organic dispersion as 60 wt. % and it is usually in a range of 5 to 50 wt. % preferably 10 to 40 wt. %.

The viscosity of the organic dispersion is varied from 10 cps to $10 \times 10^6$ cps depending upon a concentration of the dispersion and a kind of the hydrophilic organic medium. In the purpose of the preparation of a film of the copolymer by a casting etc., it is usually in a range of 100 cps to 10,000 cps.

The organic dispersion obtained by the process of the present invention can be utilized as the organic solvent solution and can be used for various purposes and uses. It is possible to give high concentration as 60 wt. %, and accordingly, the usages of the organic dispersion are broad and effective. The organic dispersion can be fabricated into a film and a sheet having a desired shape used for electrolysis, dialysis and a fuel cell by casting the organic dispersion or impregnating it into a porous substrate made of asbestos or polytetrafluoroethylene and evaporating the hydrophilic organic medium. Moreover, the organic dispersion is remarkably effective for repairing pin holes and torn parts of the resulting film or the other film for membranes. The organic dispersion can be also effectively used for coating a surface of a substrate such as a spaces net and an electrode.

A further understanding can be obtained by reference to certain specific examples which are provided herein for purposes of illustration only and are not intended to be limiting unless otherwise specified.

EXAMPLE 1

In a 0.2 liter stainless steel autoclave, 100 g. of deionized water, 0.2 g. of $C_8F_{17}COONH_4$, 0.5 g. of $Na_2HPO_4.12H_2O$, 0.3 g. of $NaH_2PO_4.2H_2O$ and 0.026 g. of $(NH_4)_2S_2O_8$ were charged and then, 20 g. of $CF_2=CFO(CF_2)_3COOCH_3$ was charged. Air in the autoclave was purged with liquid nitrogen and the autoclave was heated at 57° C. and tetrafluoroethylene was fed to a pressure of 11.0 kg/cm² to react them. During the reaction, tetrafluoroethylene was continuously fed to maintain the pressure of 11.0 kg/cm². After 4.5 hours, the unreacted tetrafluoroethylene was purged to finish the reaction. The unreacted $CF_2=CFO(CF_2)_3COOCH_3$ was separated by extracting it with trichlorotrifluoroethane to obtain a stable aqueous dispersion having a concentration of 19 wt. %. The component of $CF_2=CFO(CF_2)_3COOCH_3$ in the copolymer was 20.3 mol %. The aqueous dispersion was separated into the aqueous medium and the polymer concentrated layer by a centrifugal separator. The aqueous medium was removed and the same amount of water was added and the centrifugal separation was repeated. The operation was repeated for 3 times to remove electrolytes used in the polymerization. In the concentrated layer, 15 g. of an organic mixture of N-methylpyrrolidone and methanol (2.5:1 by weight) was added to form a dispersion and the centrifugal operation was repeated. The organic mixture was added to the concentrated layer to prepare an organic dispersion having a concentration of the copolymer 20 wt. % which had a viscosity of 1,000 cps.

The organic dispersion was flow-spread on a clean glass plate (washed) and was kept at 50° C. for 10 hours and then, at 150° C. for 5 hours in an electric oven to obtain a desired film of the copolymer having a thickness of 300μ. The film was hydrolyzed to obtain an ion exchange membrane having an ion exchange capacity of 1.43 meq/g. dry resin.

EXAMPLE 2

In accordance with the process of Example 1 except that propanol was used instead of the organic mixture of N-methylpyrrolidone and methanol, an organic dispersion having a concentration of the copolymer of 35 wt. % was obtained. The organic dispersion had a viscosity of 250 cps and was flow-spread on a glass plate and kept at 50° C. for 20 hours to obtain a desired film.

EXAMPLE 3

In accordance with the process of Example 1 except that

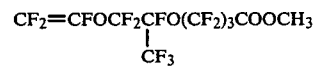

was charged instead of $CF_2=CFO(CF_2)_3COOCH_3$ and the reaction pressure was changed to 13 kg/cm², the copolymerization was carried out to obtain 19 wt. % of an aqueous dispersion of a copolymer having a component of $$CF_2=CFOCF_2\underset{\underset{CF_3}{|}}{C}FO(CF_2)_3COOCH_3$$

of 16.0 mol %. The aqueous dispersion was treated with an ion exchange resin to desalt the electrolytes. In the aqueous dispersion, 100 g. of diethyleneglycol monomethyl ester was added and water was evaporated by a rotary evaporator and diethyleneglycol monomethyl ester was added. The operation was repeated for 3 times and diethyleneglycol monomethyl ester was concentrated to obtain a stable organic dispersion having a concentration of the copolymer of 30 wt. % and a viscosity of 380 cps.

EXAMPLE 4

In a 0.2 liter stainless steel autoclave, 100 g. of deionized water, 0.2 g. of $C_8F_{17}COONH_4$, 0.5 g. of $Na_2HPO_4.12H_2O$, 0.3 g. of $NaH_2PO_4.2H_2O$ and 0.026 g. of $(NH_4)_2S_2O_8$ were charged and then, 20 g. of $CF_2=CFOCF_2CF(CF_3)OCF_2CF_2SO_2F$ was charged. Air in the autoclave was purged with liquid nitrogen and the autoclave was heated at 57° C. and tetrafluoroethylene was fed to a pressure of 15.0 kg/cm² to react them. During the reaction, tetrafluoroethylene was continuously fed to maintain the pressure of 15.0 kg/cm². After 3.5 hours, the unreacted tetrafluoroethylene was purged to finish the reaction. The unreacted $CF_2=CFOCF_2CF(CF_3)OCF_2CF_2SO_2F$ was separated by extracting it with trichlorotrifluoroethane to obtain a stable aqueous dispersion having a concentration of 19 wt. %. The component of $CF_2=CFOCF_2CF(CF_3)OCF_2CF_2SO_2F$ in the copolymer was 12.1 mol %. The aqueous dispersion was separated into an aqueous medium and the polymer concentrated layer by a centrifugal separator. The aqueous medium was removed and the same amount of water was added and the centrifugal separation was repeated. The operation was repeated for 3 times to remove electrolytes used in the polymerization. In the concentrated layer, 15 g. of an organic mixture of N-methylpyrrolidone and methanol (2.5:1 by weight) was added to form a dispersion and the centrifugal operation was repeated. The organic mixture was added to the concentrated layer to prepare an organic dispersion having a concentration of the copolymer of 20 wt. % which had a viscosity of 1,200 cps.

The organic dispersion was flow-spread on a clean glass plate (washed) and was kept at 50° C. for 10 hours and then at 150° C. for 5 hours in an electric oven to obtain a desired film of the copolymer having a thickness of 300μ. The film was hydrolyzed to obtain an ion exchange membrane having an ion exchange capacity of 0.85 meq/g. dry resin.

EXAMPLE 5

In accordance with the process of Example 4 except that propanol was used instead of the organic mixture of N-methylpyrrolidone and methanol, an organic dispersion having a concentration of the copolymer of 35 wt. % was obtained. The organic dispersion had a viscosity of 300 cps and was flow-spread on a glass plate and kept at 50° C. for 20 hours to obtain a desired film.

EXAMPLE 6

In accordance with the process of Example 4 except that $$CF_2=CFO(CF_2)_3\overset{\overset{O}{\|}}{P}(OCH_3)_2$$

was charged instead of $CF_2=CFOCF_2CF(CF_3)OCF_2CF_2SO_2F$ and the reaction pressure was changed to 14 kg./cm², the copolymerization was carried out to obtain 19 wt. % of an aqueous dispersion of a copolymer having a component of $$CF_2=CFO(CF_2)_3\overset{\overset{O}{\|}}{P}(OCH_3)_2$$

of 14.3 mol %. The aqueous dispersion was treated with an ion exchange resin to desalt the electrolytes. In the aqueous dispersion, 100 g. of diethyleneglycol monomethyl ester was added and water was evaporated by a rotary evaporator and diethyleneglycol monomethyl ether was added. The operation was repeated for 3 times and diethyleneglycol monomethyl ester was concentrated to obtain a stable organic dispersion having a concentration of 30 wt. % and a viscosity of 420 cps.

We claim:

1. A process for preparing a dispersion of a fluorinated copolymer containing acid groups or groups convertible to acid groups in an organic solvent, consisting essentially of:
   copolymerizing a fluorinated ethylenically unsaturated monomer and a monomer containing an acid group or group convertible into an acid group in an aqueous medium containing a polymerization initiator thereby obtaining an aqueous dispersion of a fluorinated copolymer having an acid group or a group convertible to an acid group content of 5 to 40 mole %; and
   substituting the aqueous medium of said dispersion with a hydrophilic organic solvent while maintaining the dispersion of said copolymer, whereby a concentration of copolymer exceeding 5% by wt in said dispersion is obtained.

2. The process according to claim 1 wherein said functional monomer is a fluorovinyl compound having the formula $$CF_2=CX+(CFX')_{\overline{p}}(OCF_2CFY)_{\overline{l}}(O)_{\overline{m}}(CFY')_{\overline{n}}A$$

wherein p is 0 or 1; l is 0 to 3, m is 0 to 1; n is 0 to 12; X represents —F, —Cl or —CF₃; X' represents —F or —CF₃; Y represents —F or —CF₃; Y' represents —F or a $C_{1-10}$ perfluoroalkyl group; A represents —CN, —COF, —COOH, —COOR₁,
  —COOM or —COONR₂R₃, —SO₂F, —SO₃M, $$-SO_3H,\ -\overset{\overset{O}{\|}}{P}(OH)_2,\ -\overset{\overset{O}{\|}}{P}(OR^4)_2,\ \text{and}\ -\overset{\overset{O}{\|}}{P}(OM)_2;$$

R₁ represents a $C_{1-10}$ alkyl group; R₂ and R₃ respectively represent —H or R₁; R₄ represents R₁; M represents an alkali metal atom or a quaternary ammonium group.

3. The process according to claim 1 wherein said fluorinated ethylenically unsaturated monomer is a fluorinated olefin having the formula $CF_2=CZZ'$ wherein Z and Z' each represent —F, —Cl, —H or —$CF_3$.

4. The process according to claim 2 wherein said functional mononer is a fluorovinyl compound having the formula

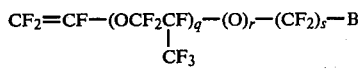

wherein q is 0 or 1; r is 0 or 1; s is an integer of 0 to 8; and B represents

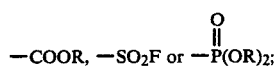

R represents a lower alkyl group.

5. The process according to claim 3 wherein said fluorinated ethylenically unsaturated monomer is tetrafluoroethylene.

6. The process according to claim 1 wherein said copolymerization is conducted at 20° to 90° C.

7. The process according to claim 1 wherein said copolymerization is conducted under a pressure greater than 7 kg/cm².

8. The process according to claim 1 wherein said hydrophilic organic solvent is selected from the group consisting of alcohols, ketones, organic acids, aldehydes, amines, pyrrolidones, esters and ethers.

9. The process according to claim 1, wherein said copolymerization is conducted under conditions in which the concentration of said fluorinated copolymer is kept less than 40 weight % in the aqueous dispersion.

10. The process according to claim 1, wherein said dispersion based on said hydrophilic organic solvent contains up to 30 weight % water.

11. The process of claim 1, which further comprises forming said organic solvent based dispersion by removing a portion of the water from said aqueous dispersion; adding said hydrophilic organic solvent to said aqueous dispersion from which water has been removed; removing a portion of the liquid medium from said organic solvent containing dispersion; and then adding additional organic solvent to said dispersion.

* * * * *